(12) United States Patent
Sacchetti et al.

(10) Patent No.: US 6,300,273 B1
(45) Date of Patent: Oct. 9, 2001

(54) CATALYSTS FOR THE (CO) POLYMERIZATION OF ETHYLENE

(75) Inventors: Mario Sacchetti; Illaro Cuffiani, both of Ferrara (IT)

(73) Assignee: Basell Technology Company B.V., Hoofddorp (NL)

(*) Notice: Subject to any disclaimer, the term of this patent is extended or adjusted under 35 U.S.C. 154(b) by 0 days.

(21) Appl. No.: 08/873,580

(22) Filed: Jun. 12, 1997

Related U.S. Application Data

(63) Continuation of application No. 08/587,090, filed on Jan. 16, 1996, now abandoned, which is a continuation of application No. 08/271,170, filed on Jul. 6, 1994, now abandoned.

(30) Foreign Application Priority Data

Jul. 7, 1993 (IT) .............................................. MI93A1466

(51) Int. Cl.$^7$ ...................................................... B01J 31/02
(52) U.S. Cl. ........................ 502/126; 502/105; 502/104; 502/129; 502/134; 526/142; 526/209; 526/348
(58) Field of Search ...................................... 502/126, 105, 502/104, 129, 134; 526/142, 209, 348

(56) References Cited

U.S. PATENT DOCUMENTS

| | | | |
|---|---|---|---|
| 4,107,413 | * 8/1978 | Giannini et al. | ................. 526/125.6 |
| 4,218,339 | 8/1980 | Zucchini et al. . | |
| 4,399,054 | 8/1983 | Ferraris et al. . | |
| 4,472,520 | 9/1984 | Zucchini et al. . | |
| 4,476,289 | 10/1984 | Mayr et al. . | |
| 4,495,338 | 1/1985 | Mayr et al. . | |
| 4,748,221 | 5/1988 | Collomb et al. . | |
| 4,803,251 | 2/1989 | Goode et al. . | |
| 4,978,648 | * 12/1990 | Barbe et al. | ......................... 526/125 |
| 5,055,535 | * 10/1991 | Spitz et al. . | |
| 5,578,541 | * 11/1996 | Sacchetti et al. | .................... 502/126 |

FOREIGN PATENT DOCUMENTS

| | | |
|---|---|---|
| 0 373 999 A1 | 6/1990 | (EP) . |
| 0 395 083 A2 | 10/1990 | (EP) . |
| 0 434 082 A2 | 6/1991 | (EP) . |
| 452156 | * 10/1991 | (EP) . |
| 0 449 302 A2 | 10/1991 | (EP) . |
| 0 546 573 A1 | 6/1993 | (EP) . |
| 0 553 805 A1 | 8/1993 | (EP) . |
| 0 601 525 | * 6/1994 | (EP) . |
| 0 601 525 A1 | 6/1994 | (EP) . |
| 0 604 846 | * 7/1994 | (EP) . |
| 0 604 846 A2 | 7/1994 | (EP) . |

* cited by examiner

Primary Examiner—David W. Wu
Assistant Examiner—Ling-Siu Choi
(74) Attorney, Agent, or Firm—Bryan Cave LLP

(57) ABSTRACT

The present invention relates to catalysts for the polymerization of ethylene and its mixtures with olefins $CH_2=CHR^{VIII}$, comprising the reaction product of a solid catalyst component containing Ti, Mg and halogen, an alkyl-Al compound and a particular electron donor compound selected from the compounds containing at least two oxygen atoms bonded to different carbon atoms and selected by standard tests of reactivity with triethyl-Al and $MgCl_2$ compounds. The catalyst of the invention are used in processes for the (co)polymerization of ethylene to prepare (co)polymers having narrow molecular weight distribution (MWD).

16 Claims, No Drawings

CATALYSTS FOR THE (CO) POLYMERIZATION OF ETHYLENE

This is a continuation of U.S. application Ser. No. 08/587,090 filed Jan. 16, 1996, now abandoned, which was a continuation of U.S. application Ser. No. 08/271,170, filed Jul. 6, 1994, now abandoned.

The present invention relates to catalysts for the polymerization of ethylene and its mixtures with olefins $CH_2=CHR^{VIII}$, wherein $R^{VIII}$ is an alkyl, cycloalkyl or aryl radical having 1–12 carbon atoms, comprising the reaction product of a solid catalyst component containing Ti, Mg and halogen, an alkyl-Al compound and a particular electron donor compound. The catalyst of the invention is suitably used in (co)polymerization processes of ethylene to prepare (co)polymers having narrow Molecular Weight Distribution (MWD). The MWD is an important characteristic of ethylene polymers in that it affects both the rheological behaviour, and therefore the processability, and the final mechanical properties. In particular, in the case of LLDPE, polymers with narrow MWD are suitable for films and injection molding in that deformation and shrinkage problems in the manufactured article are minimized.

The width of the molecular weight distribution for the ethylene polymers is generally expressed as melt flow ratio F/E, which is the ratio between the melt index measured by a load of 21.6 Kg (melt index F) and that measured with a load of 2.16 Kg (melt index E). The measurements of melt index are carried out according to ASTM D-1238 and at 190° C.

A catalyst for preparing ethylene (co)polymers having narrow MWD is described in the European patent application EP-A-373999: the catalyst comprises a solid catalyst component consisting of a titanium compound supported on magnesium chloride, an alkyl-Al compound and an electron donor compound (external donor) selected from monoethers of the formula R'OR". Good results in terms of narrow MWD are only obtained when the solid component also contains an internal electron donor compound (diisobutylphthalate).

New catalysts for the polymerization of ethylene and mixtures thereof with one or more olefins $CH_2=CHR^{VIII}$ have been now found, which comprise particular external electron donor compounds and are particularly suitable for the preparation of ethylene (co)polymers with narrow MWD. Furthermore, when the catalysts of the invention are used for the preparation of LLDPE, the products obtained are characterized by a low content of xilene soluble fractions, a property which makes them particularly interesting for applications such as films and materials for the foodstuffs sector. Moreover, the polymers obtained with the catalyst of the invention show interesting rheological properties in that the intrinsic viscosity of the soluble fractions has relatively high values, thus improving the processability of the polymers. In particular, remarkable improvements are found in the processes for preparing very low density ethylene copolymers (VLDPE and ULDPE) wherein the reactor fouling phenomena are significantly reduced. The catalysts of the invention comprise the reaction product of:

(a) a solid catalyst component comprising a magnesium halide in the active form and a titanium compound containing at least one Ti-halogen bond;
(b) an alkyl-Al compound;
(c) an electron donor compound selected from compounds containing at least two oxygen atoms bonded to different carbon atoms, said compounds being reactive with $MgCl_2$ but not with triethyl-Al under standard conditions.

Preferably the electron donor compound (c) is a diether and in particular a 1,3-diether.

The reactivity test of compound (c) with respect to triethyl-aluminium is carried out using a potentiometer METROHM mod. E 536, equipped with titration table E 535, an automatic burette E 552, a magnetic stirrer E 549 and a titration cell EA 880. A combined electrode EA 281 (Pt/Ag/AgCl/KCl 3M) is used. As titrating agent a 0.5 M $AlEt_3$ hexane solution is used, which is added to a 0.5 molar benzene solution of the compound to be tested, operating at room temperature and under nitrogen atmosphere. The compound (c) does not show an appreciable variation or jump of potential at the titration equivalence point. The reactivity test of the electron donor compound (c) with $MgCl_2$ is carried out under the following conditions: into a 100 $cm^3$ glass reactor equipped with mechanical stirrer, 70 $cm^3$ of n-heptane, 12 mmols of anhydrous $MgCl_2$ activated as hereinbelow described, 2 mmols of electron donor compound (c) are introduced. The mixture is heated at 60° C. for 4 hours (stirring speed 100 r.p.m.), then is filtered off and washed at room temperature with 100 $cm^3$ of n-heptane and dried. The amount of the compound (c) complexed is determined by treatment of the solid with 100 $cm^3$ of ethyl alcohol and gaschromatographic analysis of the solution. The magnesium chloride used in the standard test is prepared as follows: into a 1 litre vibrating mill (Siebtechnik's Vibratom) containing 1.8 Kg of 16 mm diameter stell balls, 50 g of anhydrous $MgCl_2$ and 6.8 $cm^3$ of 1,2-dichloroethane are introduced under a nitrogen atmosphere. The mixture is milled at room temperature for 96 hours and the solid obtained is dried at 50° C. for 16 hours under vacuum.

The magnesium halide present in the solid component (a) is preferably magnesium chloride in the active form. The active form of magnesium chloride used in the preparation of solid catalyst components for the polymerization of olefins is well-known in the art. It was first described in U.S. Pat. No. 4,495,338 and U.S. Pat. No. 4,476,289 as being characterized by X-ray spectrum wherein the most intense diffraction line appearing in the spectrum of the non active chloride is diminished in intensity and in said spectrum a halo appears, the maximum intensity of which is shifted towards lower angles in comparison to that of the most intense line.

Among the titanium compounds containing at least one Ti-halogen bond, those having the formula $Ti(OR^{VIII})_{n-y}X_y$, wherein $R^{VIII}$ is a hydrocarbyl radical having 1–12 carbon atoms or a $COR^{VIII}$ group, n is the titanium valence and y is a number comprised between 1 and n, are preferred.

The solid component (a) can be suitably prepared by reaction between a titanium compound of the formula $Ti(OR^{VIII})_{n-m}X_m$, wherein n is the valence of titanium and m is a number comprised between 0 and n, and a magnesium chloride obtained by dealcoholation of an adduct $MgCl_2 \cdot pR^{VIII}OH$, wherein p is a number from 1 to 6 and $R^{VIII}$ is a hydrocarbyl radical having 1–12 carbon atoms. Optionally the reaction can be carried out in the presence of a halogenating compound or a reducing compound or a mixture of the two, or a compound having both halogenating and reducing activity.

Examples of preparation of the solid catalyst component are described in U.S. Pat. Nos. 4,218,339 and 4,472,520, the description of which is herein included as reference. Solid components of the catalyst can also be prepared according to the methods described in U.S. Pat. Nos. 4,748,221 and 4,803,251. Particulary preferred are the catalyst components endowed with regular morphology, for example spherical or spheroidal. Examples of said components are described in U.S. Pat. No. 4,399,054 and in patent applications EP-A-395083, EP-A-553805, EP-A-553806, EP-A-601525 and EP-A-604846, the description of which is herein included as reference.

The alkyl aluminium compound (b) is preferably selected from aluminium trialkyls, such as trimethyl-Al, triethyl-Al, triisobutyl-Al, tri-n-butyl-Al, tri-n-octyl-Al. Mixture of Al-trialkyls with Al-alkylhalides or Al-alkylsesquihalides such as $AlMe_2Cl$, $AlEt_2Cl$ and $Al_2Et_3Cl_3$ can be used as well as compounds containing two or more Al atoms linked together by O, N atoms or $SO_3$ or $SO_4$ groups.

The electron donor compound (c) is preferably selected from 1,3-diethers of the formula (I)

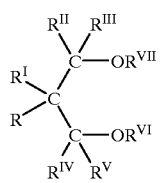

wherein R, $R^I$, $R^{II}$, $R^{III}$, $R^{IV}$, $R^V$, same or different from each other, are hydrogen or linear or branched alkyl radicals, cycloalkyl, aryl, alkylaryl or arylalkyl radicals having 1–18 carbon atoms, with the provision that R and $R^I$ cannot both be hydrogen; $R^{VI}$ and $R^{VII}$, same or different from each other, are linear or branched alkyl radicals, cycloalkyl, aryl, alkylaryl or arylalkyl radicals having 1–18 carbon atoms; when radicals from $R^I$ to $R^V$ are hydrogen and $R^{VI}$ and $R^{VII}$ are methyl, R cannot be methyl; at least two of the radicals from R to $R^{VII}$ can be linked together to form one or more cyclic structures. These compounds can be advantageously prepared according to what is described in patent EP-361493, the description of which is herein included as reference. Preferably, $R^{VI}$ and $R^{VII}$ are methyl and R and $R^I$, same or different from each other, are selected from the group consisting of propyl, isopropyl, isobutyl, t-butyl, pentyl, isopentyl, cyclopentyl, hexyl, 1,5-dimethylhexyl, cyclohexyl, methylcyclohexyl, ethylcyclohexyl, heptyl, 3,7-dimethyloctyl, phenyl.

Some examples of 1,3-diethers useable in the catalysts of the invention are: 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis-(cyclohexylmethyl)-1,3-dimethoxypropane, 2,2-diisobutyl-1,3-dibutoxypropane, 2,2-diisobutyl-1,3-dimethoxypropane, 2-isopenthyl-2-isopropyl-1,3-dimethoxypropane, 2,2,4-trimethyl-1,3-dimethhoxypentane, 1,1-bis(methoxymethyl)cyclohexane, (±) 2,2-bis-(methoxymethyl)norbornane, 2-isopropyl-2-(3,7-dimethyloctyl)-1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 2,2-dicyclohexyl-1,3-dimethoxypropane, 2,2-dipropyl-1,3-dimethoxypropane, 2-isopropyl-2-isobutyl-1,3-dimethoxypropane.

The catalysts of the invention are suitably used in processes for the polymerization of ethylene and its mixtures with olefins $CH_2=CHR^{VIII}$, wherein $R^{VIII}$ is an alkyl, cycloalkyl or aryl radical having 1–12 carbon atoms, either in liquid or gas phase, thus obtaining polymers characterized by a narrow MWD. For example, high density polyethylene (HDPE; density higher than 0.940) among which ethylene homopolymers and copolymers of ethylene with alpha-olefins having from 3 to 12 carbon atoms; linear low density polyethylene (LLDPE, density lower than 0.940) and linear very low and ultra low density polyethylene (VLDPE and ULDPE; density lower than 0.920, up to 0.880) consisting of copolymers of ethylene and one or more alpha-olefins having from 3 to 12 carbon atoms and a content of units derived from ethylene higher than 80% by mol can be obtained.

The following examples can further illustrate the present invention, obviously, variations can be carried out without deporting from the scope of the present invention.

The properties indicated are determined according to the following methods:

MIE flow index: ASTM D-1238

MIF flow index: ASTM D-1238

Flowability: the time employed by 100 g of polymer to flow through a funnel with a 1.5 cm diameter outlet hole and walls inclined at 20° to the vertical.

Bulk density: DIN-53194

Morphology and granulometric distribution of the polymer particles: ASTM-D 1921-63

Fraction soluble in xylene: determined at 25° C.

Content of comonomer: percentage by weight of comonomer determined by I.R. spectrum Real density: ASTM 792-D Intrinsic viscosity: ASTM 2857-70

EXAMPLES

Preparation of the Spherical Support (Adduct MgCl2/EtOH)

The magnesium chloride and alcohol adduct was prepared following the method described in Example 2 of U.S. Pat. No. 4,399,054, but working at 2000 rpm instead of 10,000 rpm. The adduct containing about 3 mol of alcohol had an average size of about 60 μm with a dispersion range of about 30–90 μm.

General Method for the Preparation of the Solid Component

The spherical support prepared according to the above mentioned methods was subjected to thermal treatment under $N_2$ stream, within the temperature range of 50–150° C. until spherical particles having a residual alcohol content of about 35% (1.1 mol of alcohol for each mol of $MgCl_2$) were obtained.

300 g of this support were introduced into a 5000 cm³ reactor and suspended in 3000 cm³ of anhydrous hexane. Whilst stirring and at room temperature, 130 g of $AlEt_3$ in hexane solution (107 g/l) were slowly introduced. The mixture was heated to 60° C. and kept at this temperature for 60 minutes. The stirring was stopped, and the mixture left to settle and the clear phase was separated. The treatment was repeated twice more with $AlEt_3$ under the same conditions. Thereafter, the sediment was washed three times with anhydrous hexane and dried at 50° C. The support thus obtained showed the following characteristics:

| | |
|---|---|
| residual OEt | 5.5% (by weight) |
| residual Al | 3.6% (by weight) |
| Mg | 20.4% (by weight) |

260 g of the support were introduced into a 5000 cm³ reactor together with 3000 cm³ of anhydrous hexane. The mixture was stirred and 242 g of $Ti(OBu)_4$ were fed at room temperature, over 30 minutes. The mixture was stirred for a further 30 minutes and thereafter 350 g of SiCl$_4$ diluted with 250 cm$^3$ of hexane were supplied over 30 minutes and at room temperature. The whole was heated to 65° C. over 40 minute and this temperature was kept for 3 hours, then separating the liquid phase by sedimentation and siphoning. Thereafter, 7 washings with hexane (3000 cm$^3$ each time) were carried out, 3 of which of at 60° C. and 4 at room temperature. The component in spherical form was dried at 50° C. under vacuum.

The characteristics were as follows:

| | | |
|---|---|---|
| Total Titanium | 3.4% | (by weight) |
| Mg | 17.1% | (by weight) |
| Si | 0.9% | (by weight) |
| Cl | 57.4% | (by weight) |
| Residual Al | 1.3% | (by weight) |
| OEt | 2.9% | (by weight) |
| OBu | 13.2% | (by weight) |

Example 1

Copolymerization of ethylene with 1-butene (LLDPE)

Into a 4 litre stainless steel autoclave, degassed under nitrogen stream for 2 hours at 70° C. and then washed with anhydrous propane, 0.01 g of solid component, 0.96 g of AlEt$_3$, 2-isopropyl-2-isoamyl-1,3-dimethoxypropane [electron donor compound (c)] mixed in 25 cm$^3$ of hexane were introduced. The ratio by mol AlEt$_3$/electron donor compound was equal to 60. 800 g of anhydrous propane were finally introduced. The whole was heated to 75° C. and thereafter 2 bar of H$_2$ were introduced at the same time as 7 bar of ethylene and 350 g of 1-butene. During the polymerization the partial pressure of the ethylene was kept constant and 3 g of 1-butene were added for each 30 g of the ethylene supplied. After 3 hours the reaction was stopped by immediate purging of the reagent and propane. The results of the polymerization are reported in Table 1.

Example 2 (Comparison)

The polymerization was carried out as described in Example 1, except that no electron donor component (c) was used. The results of the polymerization are reported in Table 1.

Example 3

The same catalyst of Example 1 was used, with the difference that the electron donor compound (c) used was 2,2-diisobutyl-1,3-dimethoxypropane. The polymerization was carried out as in example 1 with the difference that instead of operating for 3 hours at 75° C., it was carried out for 30 minutes at 30° C. and than for 2.5 hours at 75° C. The results are reported in Table 1.

Example 4

The polymerization was carried out under the same conditions as example 3 with the only difference being that the electron donor compound (c) used was 2,2-diphenyl-1,3-dimethoxypropane. The results of the polymerization are reported in Table 1.

TABLE 1

| Ex. | Yeld Kg$_{pol}$/g$_{cat}$ | MIE g\10' | F\E | Bulk density (g/cm$^3$) | Density (g/cm$^3$) | Bonded butene (weight) | Insol in xil. (weight) |
|---|---|---|---|---|---|---|---|
| 1 | 17.4 | 1 | 25.5 | 0.315 | 0.9213 | 8.4% | 87.54% |
| 2 com | 22.5 | 1 | 30.0 | 0.31 | 0.9205 | 8.7% | 82.61% |
| 3 | 17.0 | 1 | 25.9 | 0.33 | 0.9259 | 3.6% | 94.74% |
| 4 | 13.8 | 1 | 24.2 | 0.335 | 0.925 | 4.6% | 93.10% |

What is claimed is:

1. Catalysts for the polymerization of ethylene and mixtures of ethylene with olefins having the formula CH$_2$=CHR$^{VIII}$, where R$^{VIII}$ is an alkyl, cycloalkyl, or aryl radical having 1–12 carbon atoms, comprising the reaction product of:
   (a) a solid catalyst component consisting essentially of a magnesium halide in the active form and titanium compound containing at least one Ti-halogen bond;
   (b) an Al-alkyl compound; and
   (c) an electron donor compound;
in which the electron donor compound (c) is selected from compounds containing at least two oxygen atoms bonded to different carbon atoms, the electron donor compound (c) being reactive towards MgCl$_2$ but not towards AlEt$_3$ under the standard conditions.

2. Catalysts according to claim 1 wherein the electron donor compound (c) is a diether.

3. Catalysts according to claim 1 wherein the electron donor compound (c) is a 1,3-diether.

4. Catalysts according to claim 1, wherein the magnesium halide is a magnesium chloride and the titanium compound is selected from the compounds of formula:

$$Ti(OR^{VIII})_{n-y}X_y$$

wherein R$^{VIII}$ is a hydrocarbyl radical having 1–12 carbon atoms or a COR$^{VIII}$ group, n is the valence of titanium and y is a number comprised between 1 and n.

5. Catalysts according to claim 4, wherein the magnesium chloride is obtained by dealcholation of MgCl$_2$.nR$^{VIII}$OH adduct wherein n is a number from 1 to 6 and R$^{VIII}$ is a hydrocarbyl radical having 1–12 carbon atoms.

6. Catalysts according to claim 1, wherein the electron donor compound (c) is selected from 1,3-diethers of the formula (I):

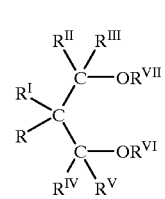

(I)

wherein R, R$^I$, R$^{II}$, R$^{III}$, R$^{IV}$, R$^V$, same or different from each other, are hydrogen or linear or branched alkyl radicals, cycloalkyl, aryl, alkylaryl or arylalkyl radicals having 1–18 carbons atoms, with the provision that R and R$^I$ cannot both be hydrogen; R$^{VI}$ and R$^{VIII}$, same or different from each other, are linear or branched alkyl radicals, cycloalkyl, aryl, alkylaryl or arylalkyl radicals having 1–18 carbon atoms; when radicals from R$^I$ to R$^V$ are hydrogen and R$^{VI}$ and R$^{VII}$ are methyl, R cannot be methyl; at least two of said radicals from R to R$^{VII}$ can be linked together to give one or more cyclic structures.

7. Catalysts according to claim 6 wherein $R^{VI}$ and $R^{VII}$ are methyl and R and $R^I$, same or different from each other are selected from the group consisting of propyl, isopropyl, isobutyl, t-butyl, pentyl, isopentyl, cyclopentyl, hexyl, 1,5-dimethylhexyl, cyclohexyl, methylcyclohexyl, ethylcyclohexyl, heptyl, 3,7-dimethyloctyl, phenyl.

8. Catalysts according to claim 1, wherein the electron donor compound (c) is selected from the group consisting of 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis-(cyclohexylmethyl)-1,3-dimethoxypropane, 2,2-diisobutyl-1,3-dibutoxypropane, 2,2-diisobutyl-1,3-dimethoxypropane, 2-isopenthyl-2-isopropyl-1,3-dimethoxypropane, 2,2,4-trimethyl-1,3-dimethhoxypentane, 1,1-bis(methoxymethyl)cyclohexane, (±)2,2-bis-(methoxymethyl)norbornane, 2-isopropyl-2-(3,7-dimethyloctyl)-1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2 -pentyl-1,3-dimethoxypropane, 2,2-dicyclohexyl-1,3-dimethoxypropane, 2,2-dipropyl-1,3-dimethoxypropane, 2-isopropyl-2-isobutyl-1,3-dimethoxypropane.

9. A catalyst for the polymerization of ethylene and mixtures of ethylene with olefins having the formula $CH_2=CHR^{VII}$, where $R^{VII}$ is an alkyl, cycloalkyl, or aryl radical having 1–12 carbon atoms, comprising the reaction product of:
  (a) a solid catalyst component containing a magnesium halide in the active form and a titanium compound containing at least one Ti-halogen bond, provided said solid catalyst component is free of an internal electron donor;
  (b) an Al-alkyl compound; and
  (c) an electron donor compound;
    in which the electron donor compound (c) is selected from compounds containing at least two oxygen atoms bonded to different carbon atoms, the electron donor compound (c) being reactive towards $MgCl_2$ but not towards $AlEt_3$ under the standard conditions.

10. Catalysts according to claim 9 wherein the electron donor compound (c) is a diether.

11. Catalysts according to claim 9 wherein the electron donor compound (c) is a 3-diether.

12. Catalysts according to claim 9, wherein the magnesium halide is a magnesium chloride and the titanium compound is selected from the compounds of formula:

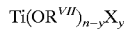

$Ti(OR^{VII})_{n-y}X_y$ wherein $R^{VIII}$ is a hydrocarby radical having 1–12 carbon atoms or a $COR^{VIII}$ group, n is the valence of titanium and y is a number comprised between 1 and n.

13. Catalysts according to claim 12, wherein the magnesium chloride is obtained by dealcholation of $MgCl_2.nR^{VIII}OH$ adduct wherein n is a number from 1 to 6 and $R^{VIII}$ is a hydrocarbyl radical having 1–12 carbon atoms.

14. Catalysts according to claim 9, wherein the electron donor compound (c) is selected from 1,3-diethers of the formula (I):

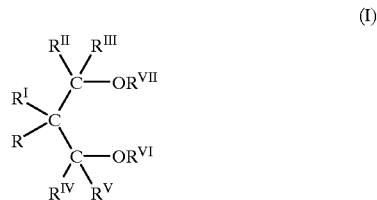

(I)

wherein R, $R^I$, $R^{II}$, $R^{III}$, $R^{IV}$, $R^V$, same or different from each other, are hydrogen or linear or branched alkyl radicals, cycloalkyl, aryl, alkylaryl or arylalkyl radicals having 1–18 carbons atoms, with the provision that R and $R^I$ cannot both be hydrogen; $R^{VI}$ and $R^{VII}$, same or different from each other, are linear or branched alkyl radicals, cycloalkyl, aryl, alkylaryl or arylalkyl radicals having 1–18 carbon atoms; when radicals from $R^I$ to $R^V$ are hydrogen and $R^{VI}$ and $R^{VII}$ are methyl, R cannot be methyl; at least two of said radicals from R to $R^{VII}$ can be linked together to give one or more cyclic structures.

15. Catalysts according to claim 13 wherein $R^{VI}$ and $R^{VII}$ are methyl and R and $R^I$, same or different from each other are selected from the group consisting of propyl, isopropyl, isobutyl, t-butyl, pentyl, isopentyl, cyclopentyl, hexyl, 1,5-dimethylhexyl, cyclohexyl, methylcyclohexyl, ethylcyclohexyl, heptyl, 3,7-dimethyloctyl, phenyl.

16. Catalysts according to claim 9, wherein the electron donor compound (c) is selected from the group consisting of 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis-(cyclohexylmethyl)-1,3-dimethoxypropane, 2,2-diisobutyl-1,3-dibutoxypropane, 2,2-diisobutyl-1,3-dimethoxypropane, 2-isopenthyl-2-isopropyl-1,3-dimethoxypropane, 2,2,4-trimethyl-1,3-dimethoxypentane, 1,1-bis(methoxymethyl)cyclohexane, (±)2,2-bis-(methoxymethyl)norbornane, 2-isopropyl-2-(3,7-dimethyloctyl)-1,3-dimethoxypropane, 2,2-diisopropyl-1,3-dimethoxypropane, 2-isopropyl-2-cyclohexylmethyl- 1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3 -dimethoxypropane, 2,2-dicylcopentyl-1,3 -dimethoxypropane, 2-heptyl-2-pentyl-1,3-dimethoxypropane, 2,2-dicyclohexyl-1,3-dimethoxypropane, 2,2-dipropyl-1,3-dimethoxypropane, 2-isopropyl-2-isobutyl-1,3-dimethoxypropane.

* * * * *

UNITED STATES PATENT AND TRADEMARK OFFICE
CERTIFICATE OF CORRECTION

PATENT NO. : 6,300,273 B1
DATED : October 9, 2001
INVENTOR(S) : Mario Sacchetti and Illaro Cuffiani It is certified that error appears in the above-identified patent and that said Letters Patent is hereby corrected as shown below:

<u>Title page,</u>
Item [30] Foreign Application Priority Data, please change "MI93A1466" to
-- M193A001466 --;
Item [56] References Cited, FOREIGN PATENT DOCUMENTS, there are two duplicate entries. Therefore, please delete "0 601 525 6/1994 (EP)" and "0 604 846 7/1994 (EP);"

ABSTRACT,
Line 9, please change "catalyst" to -- catalysts --;

<u>Column 6,</u>
Line 60, please change "carbons" to -- carbon --;

<u>Column 7,</u>
Line 47, please change "a 3-diether" to -- 1,3-diether --;
Line 51, please change "hydrocarby" to -- hydrocarbyl --.

<u>Column 8,</u>
Line 21, please change "carbons" to -- carbon --;

Signed and Sealed this

Fourteenth Day of May, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,300,273 B1
DATED : October 9, 2001
INVENTOR(S) : Mario Sacchetti and Illaro Cuffiani It is certified that error appears in the above-identified patent and that said Letters Patent is hereby corrected as shown below:

<u>Title page,</u>
Item [30], Foreign Application Priority Data, please change "MI93A1466" to
-- MI93A001466 --;
Item [56], References Cited, FOREIGN PATENT DOCUMENTS, there are two duplicate entries. Therefore, please delete "0 601 525 6/1994 (EP)" and "0 604 846 7/1994 (EP);"

Item [57], ABSTRACT,
Line 9, please change "catalyst" to -- catalysts --;

<u>Column 6,</u>
Line 60, please change "carbons" to -- carbon --;

<u>Column 7,</u>
Line 47, please change "a 3-diether" to -- 1,3-diether --;
Line 51, please change "hydrocarby" to -- hydrocarbyl --.

<u>Column 8,</u>
Line 21, please change "carbons" to -- carbon --;

This certificate supersedes Certificate of Correction issued May 14, 2002.

Signed and Sealed this

Twenty-sixth Day of November, 2002

*Attest:*

JAMES E. ROGAN
*Attesting Officer*     *Director of the United States Patent and Trademark Office*